United States Patent
Köhler et al.

(10) Patent No.: US 9,452,704 B2
(45) Date of Patent: Sep. 27, 2016

(54) LIGHTING DEVICE FOR VEHICLES

(71) Applicant: Hella KGaA Hueck & Co., Lippstadt (DE)

(72) Inventors: Stefan Köhler, Lippstadt (DE); Matthias Mallon, Hamm (DE); Thomas Niedenzu, Oelde (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 120 days.

(21) Appl. No.: 14/449,608

(22) Filed: Aug. 1, 2014

(65) Prior Publication Data

US 2015/0036372 A1 Feb. 5, 2015

(30) Foreign Application Priority Data

Aug. 2, 2013 (DE) .......... 10 2013 108 337

(51) Int. Cl.
| | |
|---|---|
| F21V 9/00 | (2015.01) |
| B60Q 1/00 | (2006.01) |
| F21V 8/00 | (2006.01) |
| B60Q 1/26 | (2006.01) |
| B60Q 1/34 | (2006.01) |
| F21S 8/10 | (2006.01) |

(52) U.S. Cl.
CPC .......... *B60Q 1/0011* (2013.01); *B60Q 1/0088* (2013.01); *B60Q 1/2607* (2013.01); *B60Q 1/34* (2013.01); *F21S 48/211* (2013.01); *F21S 48/215* (2013.01); *F21S 48/2206* (2013.01); *F21S 48/2243* (2013.01); *F21S 48/2262* (2013.01); *F21S 48/2281* (2013.01); *G02B 6/001* (2013.01); *G02B 6/0006* (2013.01); *B60Q 2400/30* (2013.01)

(58) Field of Classification Search
CPC B60Q 1/0011; B60Q 1/0088; B60Q 1/2607; B60Q 1/34; B60Q 2400/30; F21S 48/211; F21S 48/215; F21S 48/2206; F21S 48/2243; F21S 48/2262; F21S 48/2281; G02B 6/0006; G02B 6/001
See application file for complete search history.

(56) References Cited

U.S. PATENT DOCUMENTS

| | | | |
|---|---|---|---|
| 2003/0086276 A1 | 5/2003 | Ohtsuka et al. | |
| 2003/0169160 A1* | 9/2003 | Rodriguez Barros | B60Q 1/2665 340/426.1 |

(Continued)

FOREIGN PATENT DOCUMENTS

| | | |
|---|---|---|
| DE | 202007016755 U1 | 3/2008 |
| DE | 102007057399 A1 | 5/2009 |

(Continued)

*Primary Examiner* — Peggy Neils
*Assistant Examiner* — Alexander Garlen
(74) *Attorney, Agent, or Firm* — Husch Blackwell LLP

(57) ABSTRACT

A lighting device for vehicles having an optical fiber including a flat segment with two opposing flat sides, a light decoupling area, and a light coupling area. The light decoupling area in which light relayed by the flat sides is output in the primary direction of emission. The light coupling area couples the light into the optical fiber, and is arranged on a free end of a light coupling element which is perpendicular to the flat segment and projects from the same. A deflection structure is arranged between the light coupling element and the flat segment for the purpose of deflecting the light toward the flat segment. A rigid circuit board runs parallel to the flat segment. The circuit board is configured with a number of light sources which are each functionally assigned to the light coupling elements.

9 Claims, 4 Drawing Sheets

(56) References Cited

U.S. PATENT DOCUMENTS

| | | | | |
|---|---|---|---|---|
| 2009/0135621 A1* | 5/2009 | Muegge | ............... | F21S 48/215 362/516 |
| 2011/0122643 A1* | 5/2011 | Spork | ................. | F21S 48/1104 362/549 |
| 2012/0250343 A1* | 10/2012 | Koizumi | .............. | F21S 48/215 362/511 |
| 2013/0127340 A1* | 5/2013 | Huhn | .................. | B60Q 1/0041 315/77 |

FOREIGN PATENT DOCUMENTS

| | | |
|---|---|---|
| DE | 102009048032 A1 | 4/2011 |
| DE | 102011055429 A1 | 5/2013 |

\* cited by examiner

LIGHTING DEVICE FOR VEHICLES

CROSS REFERENCE

This application claims priority to German Patent Application No. 10 2013 108337.4, filed Aug. 2, 2013, which is hereby incorporated by reference.

FIELD OF THE TECHNOLOGY

The invention relates to a lighting device for vehicles, having an optical fiber including a flat segment with two opposing flat sides, wherein light is relayed through the same by total reflection, having a light decoupling area, where the light relayed by the flat sides is output in the primary direction of emission, and having a light coupling area for the purpose of coupling the light into the optical fiber, wherein the light coupling area is arranged on a free end of a light coupling element which is perpendicular to the flat segment and projects from the same, and wherein a deflection structure is arranged between the light coupling element and the flat segment, for the purpose of deflecting the light toward the flat segment, and having a rigid circuit board running parallel to the flat segment, said circuit board being configured with a number of light sources which are each functionally assigned to the light coupling elements.

BACKGROUND

A lighting device for vehicles is known from EP 2 065 635 B1, having a flat optical fiber, wherein a plurality of light sources on a light coupling side are functionally assigned to said flat optical fiber. The optical fiber has a flat segment with opposing flat sides, wherein the light which has been input is relayed toward a light decoupling area. The light decoupling area is designed on narrow side. A plurality of finger-shaped light coupling elements project from a narrow side opposite the light decoupling area, and form a light coupling area on a free end. The light sources can be arranged on a single shared, rigid circuit board which runs parallel to the level of extension of the optical fiber. Deflection means are included between the light coupling area and the flat segment of the optical fiber, such that the light can be deflected substantially by 90°, toward the light decoupling area. As a result of the fact that the light sources are always arranged in a single shared plane, it is not possible to optimally take advantage of the limited constructed space of a headlight.

SUMMARY OF THE INVENTION

The problem addressed by the present invention is therefore that of further advancing a lighting device for vehicles, having a flat optical fiber, in such a manner that the configuration ensures a linear light output, in a simple manner, with the configuration being adapted to the available constructed space.

This problem is addressed in that the invention is characterized in that the flat segment is designed as a primary flat surface, an additional flat surface of an end region of the primary segment connecting to the same at an angle to the same, wherein the additional flat surface has a light decoupling area which connects in a continuous manner to the light decoupling area of the primary flat surface, and has flat sides, wherein the additional flat segment has a light coupling area with a light coupling element for the purpose of coupling the light into the optical fiber, to which light sources, arranged on a flexible circuit board, are functionally assigned.

According to the invention, a flat optical fiber consists of a primary flat surface, on the one hand, and an additional flat surface on the other hand. The primary flat surface preferably has a longitudinally extended design, wherein a plurality of light sources, arranged on a rigid circuit board, are arranged on a light coupling side. The additional flat surface is arranged at an angle to the primary flat surface, wherein light sources are functionally assigned to the additional flat surface on a light coupling side, and are connected via a flexible circuit board. In this manner, the additional flat surface can run in a region of the housing of the lighting device which only provides a small constructed space. The optical fiber is therefore designed as a hybrid component, wherein different light input systems—preferably two light input systems—can be functionally assigned thereto. Because the preferably-larger primary flat surface is functionally assigned to the light sources arranged on a rigid circuit board, the lighting device can be manufactured relatively cheaply.

According to one preferred embodiment of the invention, the additional flat surface extends at an angle of inclination to a longitudinal axis running in a level of extension of the primary flat surface, and/or at a sweep angle to a transverse axis running in the level of extension of the primary flat surface. The additional flat surface can therefore project from the primary flat surface at any given angle therefrom, according to the available constructed space, said primary flat surface preferably extending in a straight line. By way of example, the optical fiber can therefore extend in a manner following the contour of at least two sides of a headlight housing.

According to a further development of the invention, both the light sources functionally assigned to the rigid circuit board, and the light sources functionally assigned to the flexible circuit board, are switched on via a single shared control, for the purpose of generating the same light function. By way of example, a daytime driving light or a turn signal light function can be generated in this manner. Alternatively, the light sources functionally assigned to the rigid and the flexible circuit boards can also be controlled in such a manner that two different light functions are generated—for example a turn signal light function and a daytime driving light function. In this case, by way of example, every second light source between two free ends of the optical fiber is controlled for the corresponding light function, such that, overall, a homogeneous illumination effect is achieved along the narrow-side light decoupling area.

According to a further development of the invention, a first optical fiber and a second optical fiber are arranged with the primary flat surfaces thereof shifted parallel to each other, wherein the additional flat surfaces of the two optical fibers can project in different directions. In this manner as well it is possible to generate a desired, at least partially-closed, light line figure while saving space.

According to a further development of the invention, the light sources functionally assigned to the additional flat surface are designed as LED light sources which can be clipped onto a cooling body, and which are connected to each other via a flexible circuit board and/or a flexible belt. In this case, it is advantageously possible to achieve an extension of the optical fiber equipped with a linear light decoupling area while saving space.

BRIEF DESCRIPTION OF THE DRAWINGS

Reference is now made more particularly to the drawings, which illustrate the best presently known mode of carrying

DETAILED DESCRIPTION OF THE DRAWINGS

Figure 1:
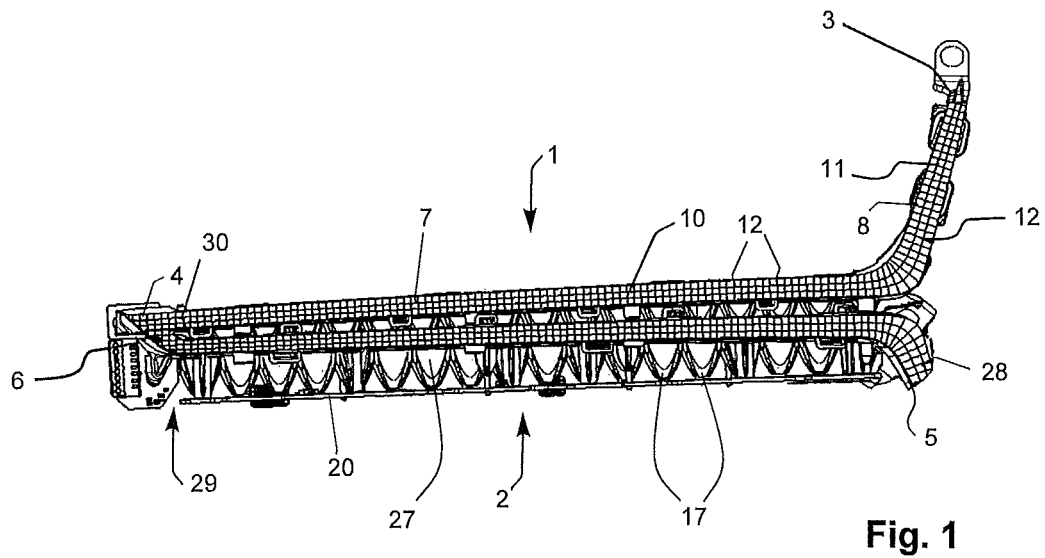
FIG. 1 shows a front view of a lighting device consisting of two optical fibers.
Figure 2:
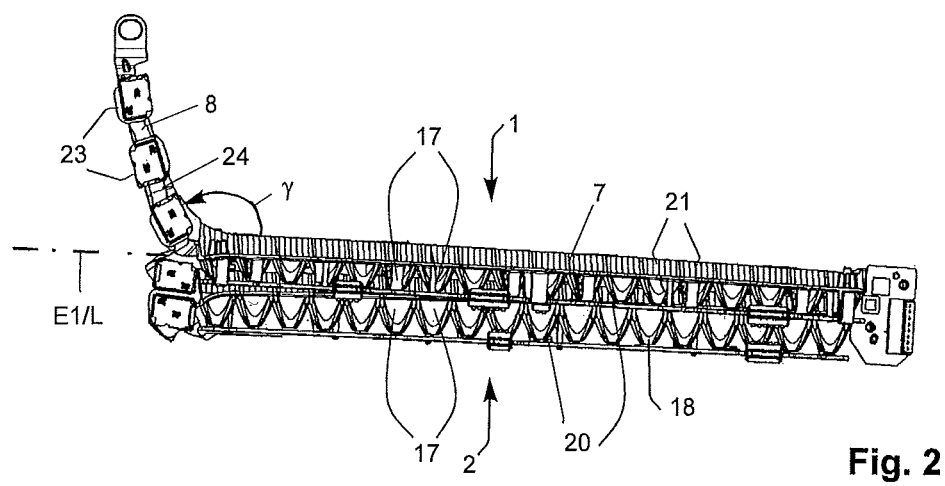
FIG. 2 shows a rear view of the lighting device.
Figure 3:
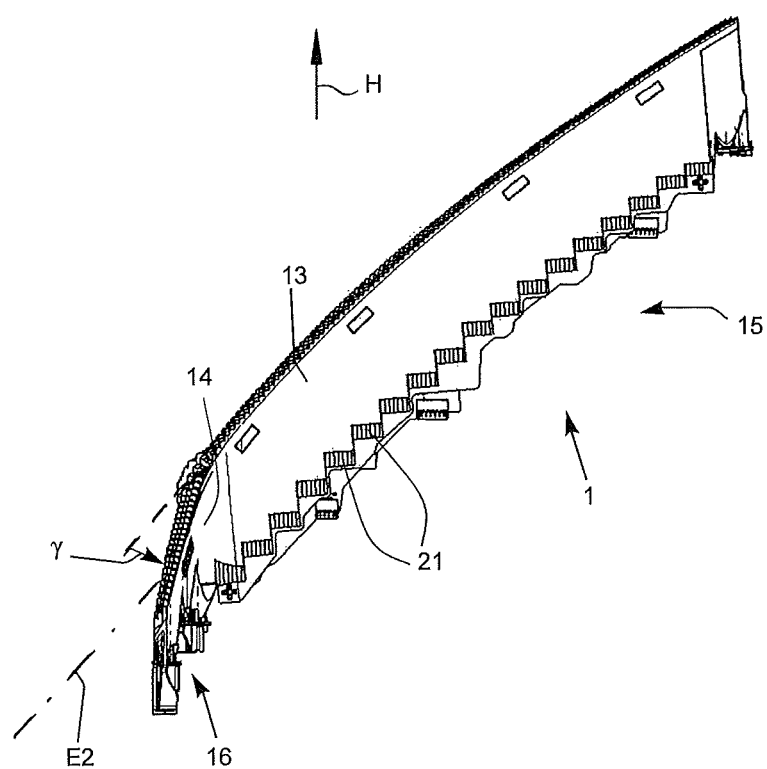
FIG. 3 shows a top view of the lighting device.
Figure 4:
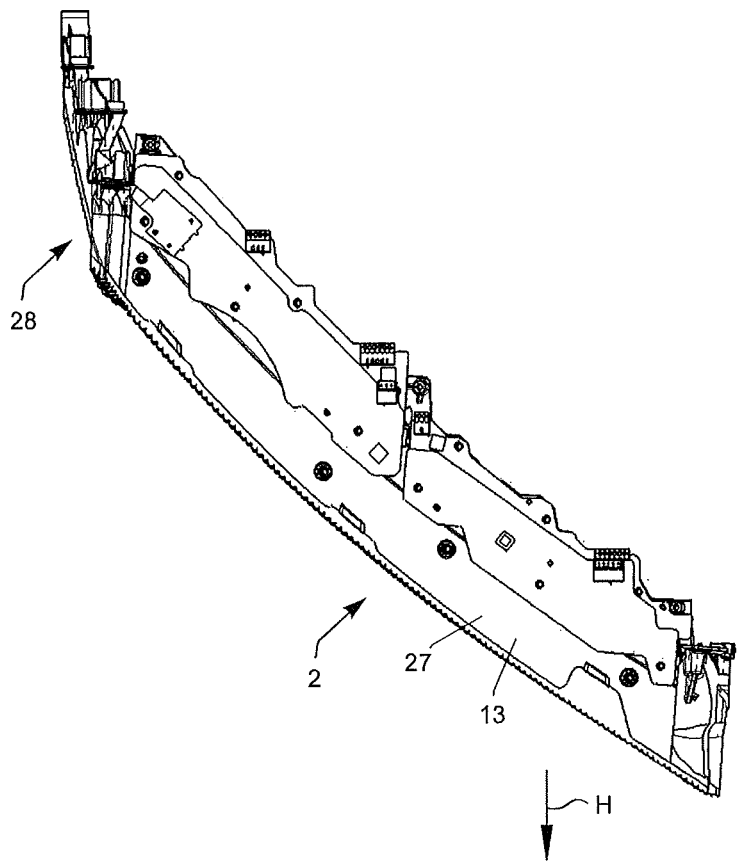
FIG. 4 shows an illustration of the lighting device from below.
Figure 5:
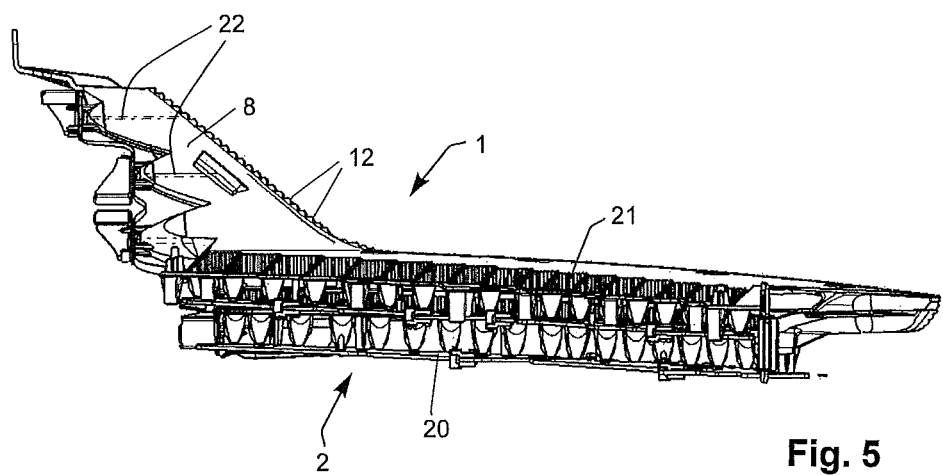
FIG. 5 shows a rear perspective view of the lighting device.
Figure 6:
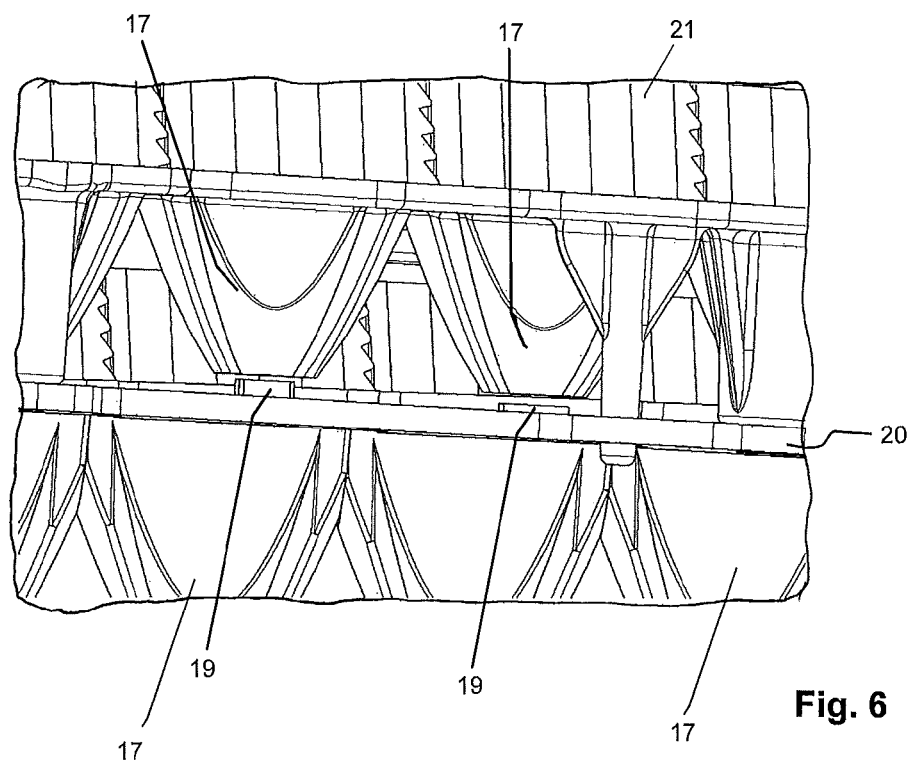
FIG. 6 shows a partial cutaway view of the lighting device in the region of the light coupling.

A lighting device for vehicles can preferably be used in a headlight for the purpose of producing daytime driving light and/or a turn signal light and/or a positioning light.

The lighting device consists of a first optical fiber 1 and a second optical fiber 2, each of which has two flat segments running at an angle to each other. The two flat segments extend between a first free end 3 and a second free end 4, of the first optical fiber 1, and/or between a first free end 5 and a second free end 6 of the second optical fiber 2.

The first optical fiber 1 has a straight primary flat surface 7 and an additional flat surface 8 which connects thereto, wherein the additional flat surface 8 projects from a first end region 9 of the primary flat surface 7 with respect to an angle of inclination ϕ and a sweep angle γ. The angle of inclination ϕ connects the primary flat surface 7 and the additional flat surface 6 with respect to a plane E2 which extends perpendicular to a level of extension E1 of the primary flat surface 7, in which the longitudinal axis L of the primary flat surface 7 runs. The sweep angle γ connects the primary flat surface 7 and the additional flat surface 8 in the level of extension E1 of the primary flat surface 7.

The primary flat surface 7 is connected to the additional flat surface 8 as a single piece. The primary flat surface 7 has a light decoupling area 10, and the additional flat surface 8 has a light decoupling area 11, each of which are configured with lens elements which are designed as cushion lens elements 12. The light is emitted into the surroundings at the light decoupling area 10, 11, in the primary direction of emission H.

Opposing flat sides 13 and 14 of the primary flat surface 7 and/or of the additional flat surface 8 connect to each other on the edge of the light decoupling area 10, 11. The flat sides 13, 14 are preferably arranged parallel to each other, and make it possible to relay the light which has been coupled from a light coupling side 15 of the primary flat surface 7 and/or of a light coupling side 16 of the additional flat surface 8 to the light decoupling area 10 and/or 11, by total reflection.

A plurality of light coupling elements 17 are arranged on the light coupling side 15 of the primary flat surface 7, each designed as a flattened ellipsoid part. A light coupling area 18 is arranged on a free end of the light coupling element 17, each of the light sources 19, designed as an LED light source, being functionally assigned thereto. The LED light sources 19 are each arranged on a rigid circuit board 20 which extends parallel to the level of extension E1 of the primary flat surface 7. A deflection structure designed as an inclined surface 21 is arranged between the light coupling element 17 and the flat sides 13 of the primary flat surface 7, by means of which the light which is coupled at 90° to the level of extension E1 is deflected toward the level of extension E1.

The additional flat surface 8 has a number of light coupling elements 22, each functionally assigned to LED light sources 23, on the light coupling side 16, which in contrast to the light coupling elements 17 project from the additional flat surface 8 in a level of extension thereof. The LED light sources 23 are arranged on a flexible circuit board 24 which runs substantially with a displacement of 90° with respect to the rigid circuit board 22. The individual LED light sources 23 can be clipped onto a cooling body—which is not illustrated—by means of a support. The flexible circuit board 24 extends, in the form of a conductor belt, between the LED light sources 23.

The flexible circuit board 24 is electrically and mechanically connected to the rigid circuit board 20 via connection lines.

The second optical fiber 2 has a primary flat surface 27 which is arranged parallel to, and with a displacement from, the primary flat surface 7 of the first optical fiber 1, and an additional flat surface 28 which creates an angle by its connection to a first region of the primary flat surface 27. The primary flat surface 27 is arranged identically to the primary flat surface 7, such that the components thereof are indicated by the same reference numbers. The additional flat surface 28 has the same component arrangement as the additional flat surface 8, such that these components are indicated by the same reference numbers. A difference between the additional flat surface 28 and the additional flat surface 8 is that it projects a shorter distance than, and in a different direction from, the additional flat surface 8 of the primary flat surface 27. The primary flat surface 27 has a closure finger 30 on a second end region 29 thereof, which abuts the flat side 13 of the first optical fiber 1 on the end face thereof. The first optical fiber 1 and the second optical fiber 2 therefore have a tuning fork-shaped contour.

The light sources 19, 23 which are functionally assigned to the first optical fiber 1 and the second optical fiber 2 can be controlled in common, in such a manner that the same light function—for example a daytime driving light function or a turn signal light function—can be emitted by the primary flat surface 7, 27 and the additional flat surface 8, 28. Alternatively, the light sources 19, 23, arranged in rows, can also emit a different color in alternation, such that different light functions—for example a daytime driving light function and a turn signal light function—can be generated by the primary flat surface 7, 27 and the additional flat surface 8, 28.

The first optical fiber 1 and the second optical fiber 2 preferably consist of a transparent plastic material.

The first optical fiber 1 and the second optical fiber 2 are each connected to a housing of a headlight—which is not illustrated—via attachment domes 31.

| Reference list | | | |
|---|---|---|---|
| 1 | optical fiber | 24 | flexible circuit board |
| 2 | optical fiber | 27 | primary flat surface |
| 3 | first end | 28 | additional flat surface |
| 4 | second end | 29 | second end region |
| 5 | first end | 30 | closure finger |
| 6 | second end | 31 | attachment dome |
| 7 | primary flat surface | | angle of inclination |
| 8 | additional flat surface | | sweep angle |
| 9 | first end region | E1, E2 | level of extension |
| 10 | light decoupling area | L | longitudinal axis |
| 11 | light decoupling area | H | primary direction of emission |
| 12 | cushion lens element | | |
| 13 | flat side | | |
| 14 | flat side | | |

-continued

| | Reference list |
|---|---|
| 15 | light coupling side |
| 16 | light coupling side |
| 17 | light coupling element |
| 18 | light coupling area |
| 19 | LED |
| 20 | rigid circuit board |
| 21 | inclined surface |
| 22 | light coupling element |
| 23 | LED |

The invention claimed is:

1. A lighting device for vehicles comprising:
an optical fiber which includes:
- a flat segment with two opposing flat sides, wherein light is relayed through said flat segment by total reflection,
- a light decoupling area where the light relayed by the flat sides is decoupled in a primary direction of emission,
- a light coupling area for the purpose of coupling the light into the optical fiber, wherein the light coupling area is arranged on a free end of at least one light coupling element, and wherein a said light coupling element is perpendicular to the flat segment and projects from the same, and
wherein a deflection structure is arranged between the light coupling element and the flat segment for the purpose of deflecting the light towards the flat segment, and having a rigid circuit board running parallel to the flat segment, said circuit board being configured with a number of light sources which are each functionally assigned to the at least one light coupling elements,
wherein the flat segment is a primary flat surface with an additional flat surface extended from an end region of the primary segment at an angle, wherein the additional flat segment has a light decoupling area which connects in a continuous manner to the light decoupling area of the primary flat segment, and has flat sides,
wherein the additional flat segment has a light coupling area with a light coupling element for the purpose of coupling the light into the optical fiber, to which light sources, arranged on a flexible circuit board, are functionally assigned, and
wherein the optical fiber comprises a first optical fiber and a second optical fiber are arranged with the primary flat surfaces of the same with a displacement parallel to each other, wherein the additional flat surfaces of the first optical fiber and the second optical fiber diverge from each other in opposite directions in the first end region of each respective primary flat surface.

2. The lighting device according to claim 1, wherein the additional flat surface extends at an angle of inclination to at least one of a longitudinal axis running in a level of extension of the primary flat surface and at a sweep angle to a level of extension running perpendicular to the level of extension of the primary flat segment.

3. The lighting device according to claim 1, wherein the rigid circuit board of the primary flat segment has at least one of a flat design and the primary flat segment has a longitudinally elongated design between a first end region and a second end region.

4. The lighting device according to claim 1 wherein connection lines of the flexible circuit board are connected to connection lines of the rigid circuit board, in such a manner that the same light function is generated by a single control shared by the light sources of the primary flat segment and the additional flat segment, or in that different light functions can be generated by a shared control of different light sources of the primary flat segment and the additional flat surface.

5. The lighting device according to claim 1 wherein the light decoupling area of the primary flat surface and the additional flat surface is a narrow side which is configured with lens elements.

6. The lighting device according to claim 1, wherein the light coupling element of at least one of the primary flat surface and the additional flat surface is a flattened ellipsoid part.

7. The lighting device according to claim 1, wherein the primary flat surface of the second optical fiber abuts the primary flat surface of the first optical fiber on the end face thereof in the second end region.

8. The lighting device according to claim 1, wherein the light sources are each LED light sources.

9. The lighting device according to claim 1, wherein the light sources which are functionally assigned to the additional flat surface are LED light sources which is clipped onto a cooling body, and are connected to each other via the flexible circuit board.

* * * * *